G. D. BURTON.
PROCESS OF PREPARING FIBROUS MATERIALS FOR THE MANUFACTURE OF PAPER.
APPLICATION FILED OCT. 9, 1906.
982,170.
Patented Jan. 17, 1911.
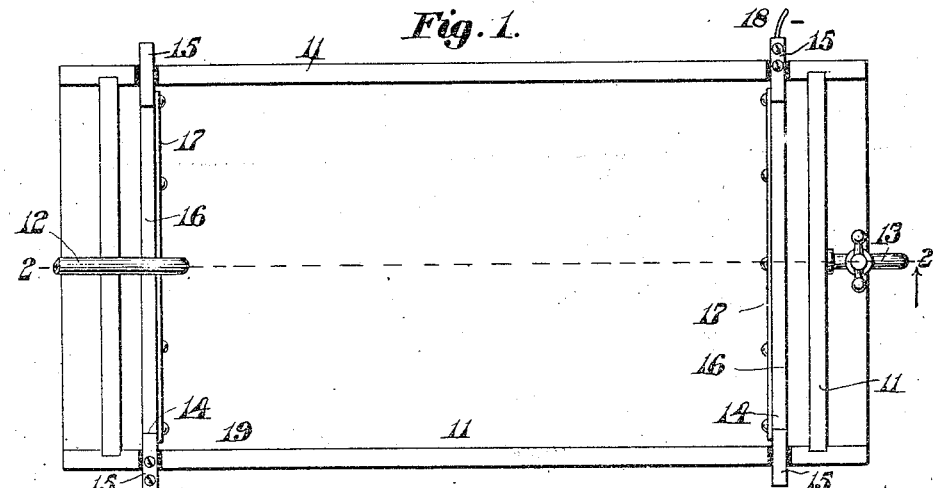
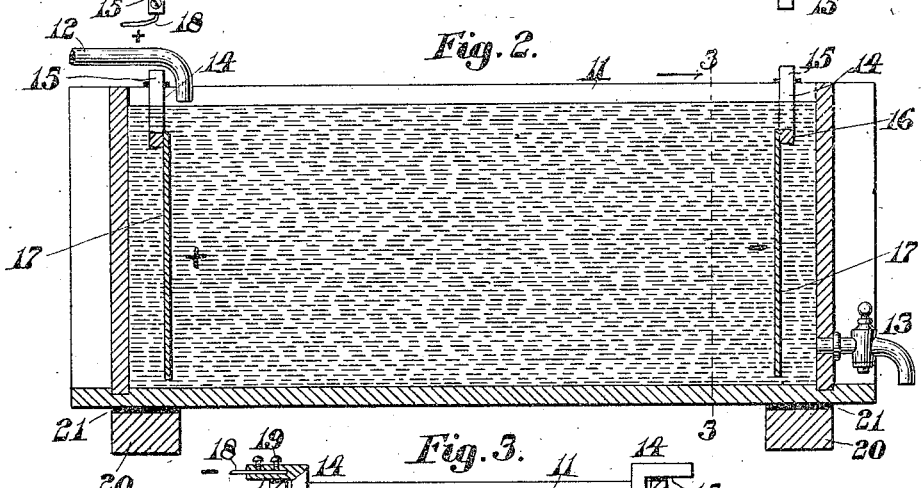
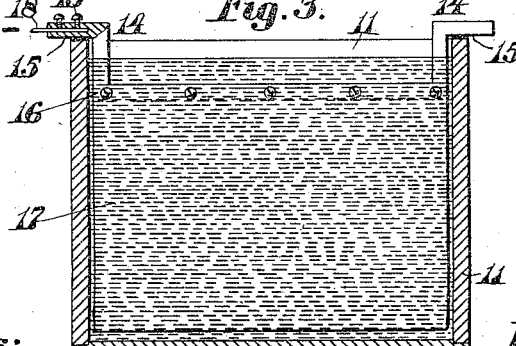
Witnesses:
Edna C Cleveland
Edwin T Lincs
Inventor:
George D. Burton,
by Walter E. Lombard,
Atty.

UNITED STATES PATENT OFFICE.

GEORGE D. BURTON, OF BOSTON, MASSACHUSETTS.

PROCESS OF PREPARING FIBROUS MATERIALS FOR THE MANUFACTURE OF PAPER.

982,170.

Specification of Letters Patent.  Patented Jan. 17, 1911.

Application filed October 9, 1906. Serial No. 338,124.

*To all whom it may concern:*

Be it known that I, GEORGE D. BURTON, a citizen of the United States of America, and a resident of Boston, in the county of Suffolk and State of Massachusetts, have invented certain new and useful Improvements in Processes of Preparing Fibrous Materials for the Manufacture of Paper, of which the following is a specification.

This invention relates to methods of treating hemp, flax or similar materials to cause them to be placed in condition to be utilized in the manufacture of paper and for other similar purposes.

The operation consists in providing in a suitable tank, vat, or other receptacle, a bath of water to which sufficient sodium carbonate is added, thus forming a solution capable of producing electrolytic gases into which may be immersed the hemp, flax or other material which it is desired to cleanse and degrease.

In the operation of the invention a tank or vat is used similar to that shown in the drawings, forming part of this application, of which—

Figure 1 represents a plan view. Fig. 2 represents a longitudinal section thereof on line 2—2 on Fig. 1, and Fig. 3 represents a section on line 3—3 on Fig. 2 looking in the direction of the arrow.

Similar characters designate like parts throughout the several figures of the drawings.

In the drawings, 11 represents a tank or vat of any ordinary construction provided with an inlet pipe 12 for supplying water thereto and a faucet or cock 13 for withdrawing the solution from said tank when desired. A bent aluminum rod 14 crosses the upper end of the tank 11 and the ends 15 thereof are supported by the sides of said tank while the main cross member 16 thereof depends into said tank and extends from side to side thereof. This cross member is usually constructed of aluminum or some other similar light conducting metal. Secured to this cross member 16 and extending nearly to the bottom of said tank is a thin metallic plate 17 forming a suitable electrode. The member 14 is provided with a conducting wire 18 secured thereto by means of set screws 19. At the opposite end of said tank is a similar electrode. A current of electricity from any suitable source is caused to pass from one electrode to the other through the bath contained within said tank. This bath consists of water which is kept at a level above the upper ends of the electrodes 17 the supply being obtained through the inlet pipe 12. To this bath is added a sufficient quantity of chemicals or chemical salts such as sodium carbonate or a weak solution of sulfuric acid to produce a suitable working solution. When it is desired to secure a more rapid action the gravity of the bath is increased to about 1.015 or 1.020, more or less, by the addition of a quantity of chlorid of sodium in the proportion of about one part chlorid of sodium to two parts sodium carbonate or the addition of such acids as sulfuric or oxalic acid. The temperature of the solution contained within the tank is then raised either by steam, gas, electricity, or other suitable means of heating to about 80° Fahrenheit, more or less. When a current of electricity is permitted to pass through the solution from one electrode 17 to the other it causes the production of an electrolytic gas.

Where old hemp rope is used the rope is cut into short sections about one and one-half to two inches long and is then placed in the solution. When flax is used it may be either cut up or operated upon in any suitable condition. The materials which it is desired to degrease and cleanse are first taken and boiled by steam or electricity for from thirty to fifty minutes, more or less, in a solution of sulfuric acid varying from two and one-half to eight per cent. according to the amount and the nature of the materials being operated upon. It is obvious that the larger the fiber of the material the more acid will be needed. Such material after treatment renders the paper made from the same stronger and whiter and very much softer. After having been acted upon in this manner the material is then immersed in the bath contained within the receptacle 11 and subjected to the action of the current of electricity passing through the same. This action will cause the dirt, grease, tar, etc., contained in the hemp and flax to be removed therefrom to be deposited upon the electrodes depending in said receptacle. The material after having been subjected to these treatments is thoroughly cleansed and in a condition for use in the manufacture of paper and as it has been freed from all impurities and foreign substances a higher grade of paper or paper stock may be manufactured therefrom than would otherwise be the case.

A direct current of electricity is usually employed which may be obtained from any suitable source varying from seventy-five to five hundred volts and from five amperes to five hundred amperes according to the size of the receptacle used and the quantity of material to be treated. In warm climates and on days when the heat is extreme the temperature of the solution will be sufficient without the necessity of heating by artificial means.

It is believed that from the foregoing the operation of the invention will be thoroughly understood without any further description.

Claims.

1. The process of treating hemp, flax or similar materials, which consists in immersing said materials in a bath, adding to said bath a solution of about one part chlorid of sodium to about two parts soda carbonate, heating the solution, and then passing through said bath a current of electricity while said material is immersed therein.

2. The process of treating hemp, flax or similar materials, which consists in immersing said materials in a bath, adding to said bath a solution of about one part chlorid of sodium to about two parts soda carbonate, and then passing through said bath a current of electricity while said material is immersed therein.

3. The process of treating hemp, flax and similar materials, which consists in boiling said materials in a solution of sulfuric acid, then immersing the same in a bath containing soda carbonate, and then passing through said bath a current of electricity while said materials are immersed therein.

4. The process of treating hemp, flax and similar materials, which consists in boiling said materials in a solution of sulfuric acid, then immersing it in a bath containing about one part chlorid of sodium and two parts soda carbonate, and then passing through said bath a current of electricity while said materials are immersed therein.

5. The process of preparing hemp, flax and similar materials for the manufacture of paper or paper stock, which consists in cutting the same into small sections, boiling said sections in a solution of sulfuric acid, immersing said sections in a bath containing soda carbonate, and subjecting the same to the action of an electric current.

Signed by me at Boston, Massachusetts, this 27th day of February, 1906.

GEO. D. BURTON.

Witnesses:
WALTER E. LOMBARD,
EDNA C. CLEVELAND.